Patented Aug. 9, 1949

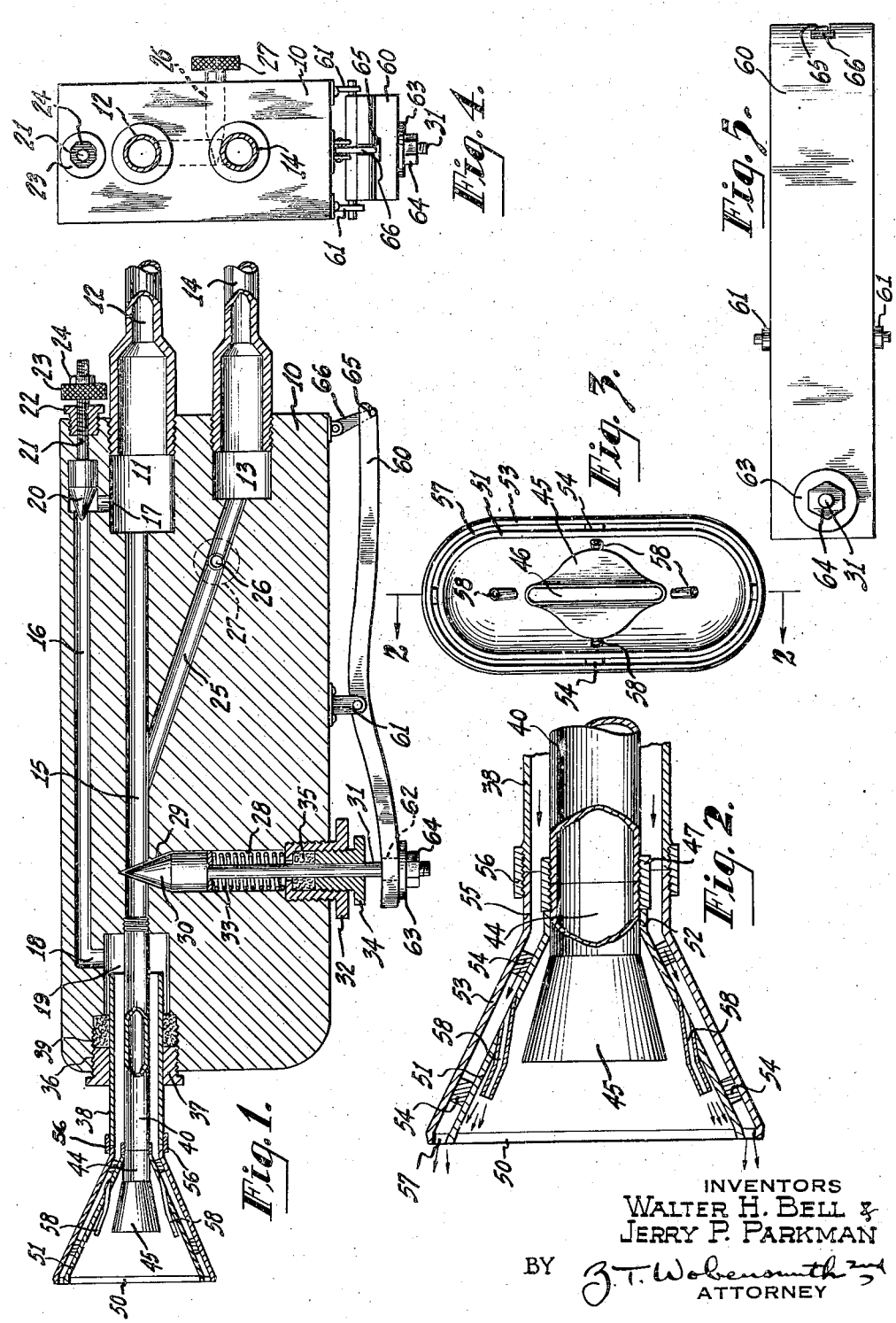
INVENTORS
WALTER H. BELL &
JERRY P. PARKMAN

2,478,557

UNITED STATES PATENT OFFICE 2,478,557

SPRAYER AND SPRAYER HEAD FOR FLUENT COATING MATERIALS

Walter H. Bell and Jerry P. Parkman, Port Arthur, Tex.

Application September 13, 1947, Serial No. 773,908

1 Claim. (Cl. 299—140)

This invention relates to sprayers and sprayer heads, and more particularly to apparatus for spraying fluent coating materials, such as paint, varnish, lacquer and the like, onto surfaces to be coated.

Various sprayers have heretofore been proposed, but none of these have proven wholly satisfactory. In most of the sprayers for coating now available the sprayed material is not properly confined in its discharge, with the result that the coating material escapes and is deposited on surfaces which are not intended or desired to be coated. Most of the sprayers for coatings which are now available are also unsuited for use out-of-doors and where the wind is blowing, because of the tendency of the paint being sprayed to escape and be deposited on surfaces which it is not desired to coat.

It is the principal object of the present invention to provide an improved sprayer and sprayer head for fluent coating materials in which the sprayed material is confined by an air wall in such a manner that the sprayed material is directed to the area on which a coating is desired.

It is a further object of the present invention to provide a sprayer for fluent coating materials in which the undesired escape of the coating material to other than the area to be covered is prevented and which is capable of use out-of-doors and when the wind is blowing without escape of the coating material.

It is a further object of the present invention to provide a sprayer for fluent coating materials in which the quantity of coating material required is reduced by confining the same to the surfaces to be coated and preventing the escape and waste of coating material which would otherwise be deposited on surfaces where no coating material was desired or required.

It is a further object of the present invention to provide a sprayer and sprayer head for fluent coating materials which is particularly suitable, by reason of its confining action of the coating material being sprayed, for coating areas where several colors are required by confining the coating material during its application to the desired area.

Other objects and advantageous features of the invention will be apparent from the specification and claims.

The nature and characteristic features of the invention will be more readily understood from the following description, taken in connection with the accompanying drawings forming part hereof, in which:

Figure 1 is a vertical central sectional view through a sprayer and sprayer head in accordance with the present invention;

Fig. 2 is a vertical central sectional view, enlarged, taken approximately on the line 2—2 of Fig. 3 and showing certain of the details of the spray head;

Fig. 3 is an end elevational view of the sprayer head as seen from the right of Fig. 2;

Fig. 4 is an end elevational view of the sprayer as seen from the left of Fig. 1; and Fig. 5 is an underneath plan view of the actuating lever as shown on Fig. 1.

It should, of course, be understood that the description and drawings herein are illustrative merely, and that various modifications and changes may be made in the structure disclosed without departing from the spirit of the invention.

Referring now more particularly to the drawings the apparatus, in accordance with the present invention, preferably includes a body portion 10 which is adapted to be held in the hand of the user. The body portion 10 has connected thereto, in any desired manner and in communication with an end bore 11, a pipe 12 which is connected to a source (not shown) of air under pressure. The body 10 also has connected thereto, and in communication with an end bore 13, a pipe 14 which is in communication with a source of liquid coating material such as paint, varnish, lacquer, or the like, with suitable solvents, which it is desired to employ as a surface coating.

Within the interior of the body 10 a longitudinally extending passageway 15 is provided in communication with the bore 11. A longitudinally extending passageway 16 is also provided having a branch 17 in communication with the bore 11 and a branch 18 in communication with an end bore 19 at the front end of the body 10. In the passageway 16 a valve is provided which includes a valve plug 20 seating in the passageway 16 and having a threaded stem 21 which is received in a bushing 22 threaded in the body 10, the interior of the bushing 22 also being threaded for the reception of the valve stem 21. An adjusting collar 23 is provided on the valve stem 21 and a lock nut 24 is provided on the stem 21 for locking the valve plug 20 in the desired adjusted position for the delivery of the desired quantity of air through the passageway 16 to the bore 19.

In the body 10, a passageway 25 is also provided, extending from bore 13 to the passageway 15. An adjusting valve 26, mounted in the body 10, and having an exterior manual actuator 27 is provided for adjusting the delivery of the fluent coating material through the passageway 25 to the passageway 15.

Within the interior of the body 10 a bore 28 is provided, disposed at right angles to the passageway 15 and having a tapered end portion 29 intersecting and extending across the passageway 15. In the inner end of the bore 28 a valve plug 30 is provided, engageable in the end 29 of the bore 28 for closing the passageway 15. The valve plug 30 is provided with a valve stem 31 which extends outwardly beyond the body portion 10. A bushing 32 is provided, in threaded engagement with the body 10. The inner end of the bushing 32 provides an abutment for a compression spring 33, which is in engagement with the valve plug 30 and normally tends to keep the valve plug 30 in position to close off the passageway 15.

A packing nut 34 is provided through which the valve stem 31 extends, the packing nut 34 being in threaded engagement with the bushing 32. Compressible packing 35 is provided in the space between the packing nut 34 and the bushing 32 for preventing fluid leakage.

At the front end of the body 10, the bore 19 is enlarged and internally threaded, as at 36, for the reception of a threaded bushing 37 and a cylindrical tube 38 is provided which extends through the bushing 37. A packing 39 compressible by the bushing 37, is provided to prevent leakage at this location.

Within the interior of the tube 38, a smaller cylindrical pipe 40 is concentrically disposed, threaded at its rear end in the body portion 10 and in communication with the passageway 15. The space between the exterior of the pipe 40 and the interior of the tube 38 provides a passageway with which the passageway 16 extending to the bore 19 is in communication.

A spray nozzle is provided at the front end of the pipe 40 and includes a rearwardly extending, externally threaded, tubular connecting portion 44 and a front nozzle portion 45. The front end of the nozzle portion is flattened and elongated and has a discharge opening 46, as indicated in Fig. 3, to provide a flat atomized stream of paint and impelling air. The spray nozzle is held in position on the tube 40 by an internally threaded sleeve 47 and is removable for the insertion of another nozzle if desired.

In order to confine the stream of fluent material from the spray nozzle an enclosing casing 50 is provided. The casing 50 includes a forwardly extending inner wall portion 51 which extends beyond the front terminal end of the spray nozzle and which is of substantially the same shape when viewed from the front end as the end of the spray nozzle, but of larger size. The wall portion 51 has a rearward extension 52 for engagement with and by the tubular portion 44 of the spray nozzle.

The enclosing casing 50 also includes a forwardly extending outer wall portion 53 similar in shape to the wall portion 51 and spaced therefrom by spacer blocks 54. The wall portion 53 has a rearward extension 55, and, at the front end of the pipe 38, an internally threaded collar 56 is provided for engagement therewith and with the rearward extension 55 for removably holding the casing 50 in position.

A passageway is thus provided between the walls 51 and 53, in communication with the passageway between the pipe 40 and the tube 38 which terminates at its front end in a discharge opening 57 for discharging a stream of air which surrounds the fluent stream from the spray nozzle.

From the passageway between the walls 51 and 53 and extending through the wall 51, a plurality of pipes 58 are preferably provided for preventing the adherence of the sprayed liquid to the interior face of the wall.

In order to retract the valve body 30 and to permit and control the delivery of coating material and air through the passageway 15 and to and through the nozzle opening 46, a manually actuatable lever 60 is provided, pivotally mounted on brackets 61 carried by the body 10. The lever 60 has an opening 62 through which the valve stem 31 extends, a washer 63 and nut 64 being provided on the outer end of the stem 31 outside the lever 60. The lever 60 extends rearwardly along the lower side of the body portion 10 and at the rear end may be provided with a notch 65 within which a locking lever 66, also pivotally mounted on the body portion 10, may engage for locking the lever 60 in fluid delivery position.

The mode of operation will now be pointed out.

Air under pressure is supplied through the pipe 12 and to the passageway 15, and fluent coating material supplied through the pipe 14 and is available for delivery to the passageway 25 and therefrom to the passageway 15. The flow through the passageway 15 and to the pipe 14 for delivery to and through the nozzle opening 46 with the coating material discharged forwardly in a jet and in atomized form is determined by the adjustment of the valve 26 and by the positioning of the valve plug 30 by manual manipulation of the lever 60. An air driven jet of fluent coating material and air is thus discharged through the nozzle opening 46 in the usual manner.

Air under pressure is also continuously delivered from the bore 11 to and through the passageway 16, in accordance with the setting of the valve 20, and passes forwardly through the bore 19, and the spaces between the pipe 40 and the tube 38 and between the walls 51 and 53, and is discharged forwardly through the opening 57 in the casing 50.

The coating material spray from the nozzle opening 46 is enclosed within and surrounded by a wall of air discharged through the opening 57. This wall of air at its discharge from the opening 57 is spaced and separated from the jet from the nozzle opening 47. There is a tendency of the fluent coating spray to diverge as it advances from the nozzle opening, but the wall of air provides an enclosing fluid wall preventing the outward divergent discharge of fluent coating material and confining the spray of fluent coating material to a limited area on the surface to be coated.

The necessity of removing the applied coating from an area which is not desired to be coated, or for masking or covering an area to protect the same from the spray, is thereby avoided. It is also possible to paint objects with two or more colors using separate sprayers with a minimum of mingling of the different colors.

The interior surface of the wall 51 is also kept clear of paint by air from the tubes 58, thereby obviating the necessity for cleaning the interior of casing 50.

We claim:

In a sprayer for fluent coating materials, a body portion, an air delivery conduit connected to said body portion, a fluent coating material conduit connected to said body portion, a fluent coating material tube mounted at the front end of said body portion and in communication with said coating material conduit, manually operable valve means in said body portion and controlling the delivery of coating material from said coating material conduit to said tube, an atomizing nozzle mounted on said tube, a flaring casing member in engagement at its rear end with said tube and extending forwardly beyond said nozzle, a second flaring casing member surrounding said first casing member and spaced therefrom, the space between said casing members being in communication with said air delivery conduit, the front ends of said casing members providing a forwardly facing discharge opening in advance of said nozzle and spaced from and surrounding said nozzle for supplying a wall of air surrounding the fluid from said nozzle, and a plurality of fluid conduits spaced around said first casing member and communicating from the space between said casing members to the interior of the inner wall of the first mentioned casing member for the delivery of air to and along said inner wall for cleaning the same.

WALTER H. BELL.
JERRY P. PARKMAN.

REFERENCES CITED

The following references are of record in the file of this patent:

UNITED STATES PATENTS

| Number | Name | Date |
| --- | --- | --- |
| 1,229,344 | Stevens | June 12, 1917 |
| 1,855,457 | Murray | Apr. 26, 1932 |
| 2,029,337 | Parker | Feb. 4, 1936 |
| 2,086,183 | Gellner et al. | July 6, 1937 |
| 2,321,792 | Bowie | June 15, 1943 |
| 2,410,532 | Tessier | Nov. 5, 1946 |